United States Patent
Chen

(10) Patent No.: US 8,646,750 B1
(45) Date of Patent: Feb. 11, 2014

(54) CERAMIC WATER CONTROL VALVE WITH CERAMIC CHIPS HAVING PRESSING LEAK-PROOF FUNCTIONS

(75) Inventor: Mei-Li Chen, Taichung (TW)

(73) Assignee: Kuching International Ltd., Taichung (TW)

( * ) Notice: Subject to any disclaimer, the term of this patent is extended or adjusted under 35 U.S.C. 154(b) by 0 days.

(21) Appl. No.: 13/564,107

(22) Filed: Aug. 1, 2012

(51) Int. Cl.
*F16K 25/00* (2006.01)
(52) U.S. Cl.
USPC . 251/160; 251/209; 137/625.15; 137/625.17; 137/625.4
(58) Field of Classification Search
USPC .......... 251/157, 158, 160, 208, 209; 137/625.12, 625.13, 625.15, 625.17, 137/625.4, 315.13
See application file for complete search history.

(56) References Cited

U.S. PATENT DOCUMENTS 5,518,027 A * 5/1996 Saiki et al. ............ 137/550

* cited by examiner

*Primary Examiner* — John K Fristoe, Jr.
*Assistant Examiner* — Marina Tietjen
(74) *Attorney, Agent, or Firm* — Egbert Law Office, PLLC

(57) ABSTRACT

A ceramic water control valve with ceramic chips having pressing leak-proof functions is provided with a pressing ceramic chip and a pressing seal ring. The sliding ceramic chip is in a directional positioning state and can be pressed to be abutted with the fixed ceramic chip more tightly and durably, so as to enhance the leak-proof effect on top of the shell. The ceramic water control valve has a lateral outgoing path pattern, which can improve its durability and applicability.

4 Claims, 5 Drawing Sheets

CERAMIC WATER CONTROL VALVE WITH CERAMIC CHIPS HAVING PRESSING LEAK-PROOF FUNCTIONS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a ceramic water control valve, and more particularly to an innovative one which enables compact assembly and leak-proofing of components by pressing the ceramic chips.

2. Description of Related Art Including Information Disclosed Under 37 CFR 1.97 and 37 CFR 1.98

The ceramic water control valve is structurally designed in a way that rotating and fixed ceramic chips within the valve casing are overlapped vertically as key components for switching or closing/opening the water flow paths.

As for common the ceramic water control valve with vertical water flow paths, the streams from inlet to outlet are fully sealed into a flow channel formed by the rotating and fixed ceramic chips, so the tightness of these ceramic chips is of utmost significance. In the event of any defective tightness between them, leakage may be occur, indicating the end of service life of the ceramic water control valve. According to the structural design of such common ceramic water control valves, the tightness between the rotating and fixed ceramic chips relies much on the elastic bracing of an O-ring seal set between the fixed ceramic chip and pedestal of the valve casing. Yet, there still lacks of a stable pressing force on the sliding ceramic chip, making it hard to sustain the tightness between the rotating and fixed ceramic chips.

As for a ceramic water control valve with underneath incoming path and lateral outgoing path, there exists possible leakage on top of the valve casing in addition to unstable pressing force on said sliding ceramic chip. This is because the trough of the sliding ceramic chip is provided with a lateral opening, which could be connected to the outlet at one side of the valve casing for lateral water discharge. However, as there exists a gap between the lateral opening of the sliding ceramic chip and the valve casing, said valve casing is filled with liquid, leading to more serious leakage on top of the valve casing. Notwithstanding an O-ring seal designed on top of the valve casing, it is found that this could not withstand high temperature during operation, leading to non-durable leak-proofing state.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

Based on the unique design of the present invention wherein said "ceramic water control valve with ceramic chips having pressing leak-proof functions" is provided with a pressing ceramic chip and a pressing seal ring, said sliding ceramic chip in directional positioning state could be pressed to be abutted with the fixed ceramic chip more tightly and durably, so as to enhance the leak-proof effect on top of the shell. As for the ceramic water control valve with a lateral outgoing path pattern, this could improve its durability and applicability.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
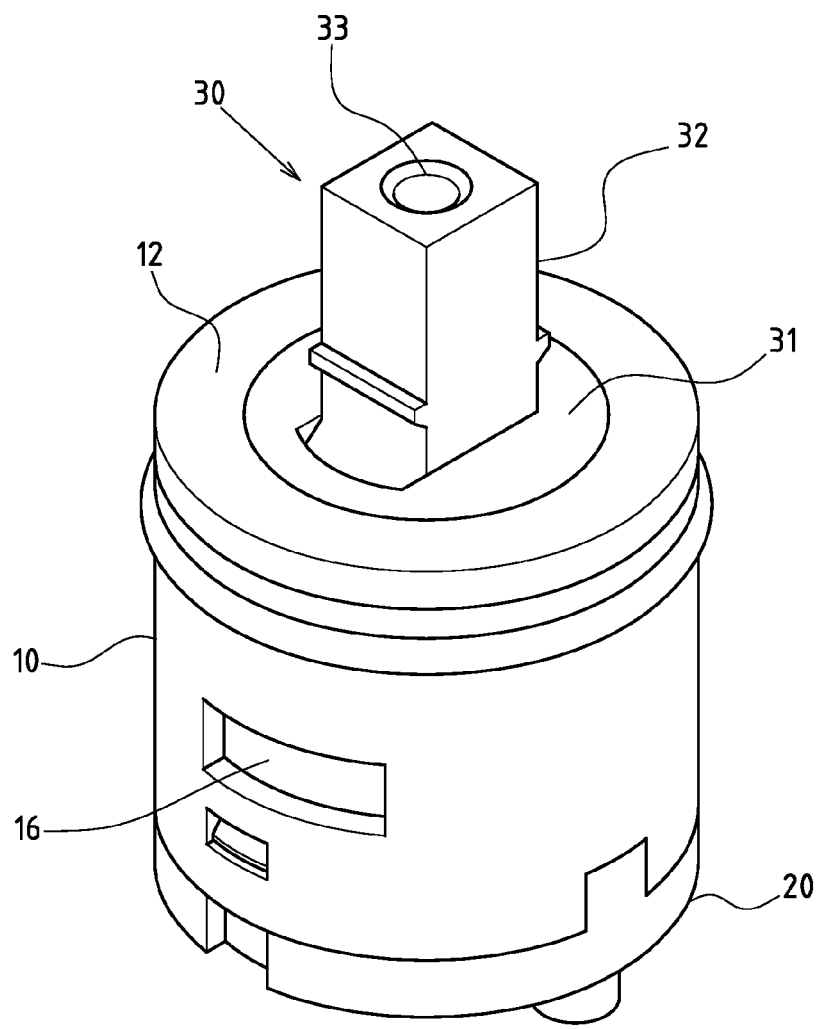
FIG. 1 is an assembled perspective view of the ceramic water control valve of the present invention.
Figure 2:
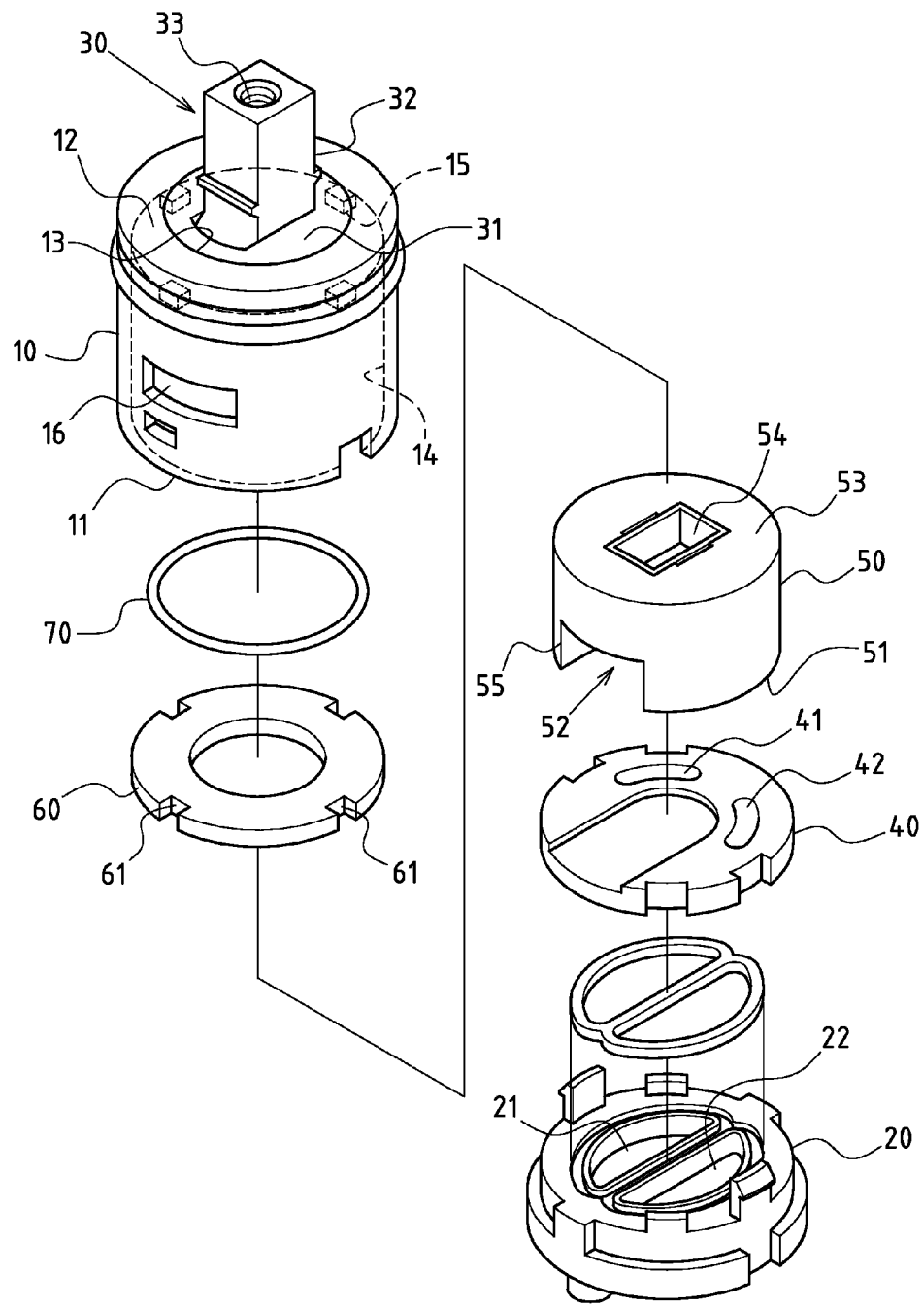
FIG. 2 is an exploded perspective view of the ceramic water control valve of the present invention.
Figure 3:
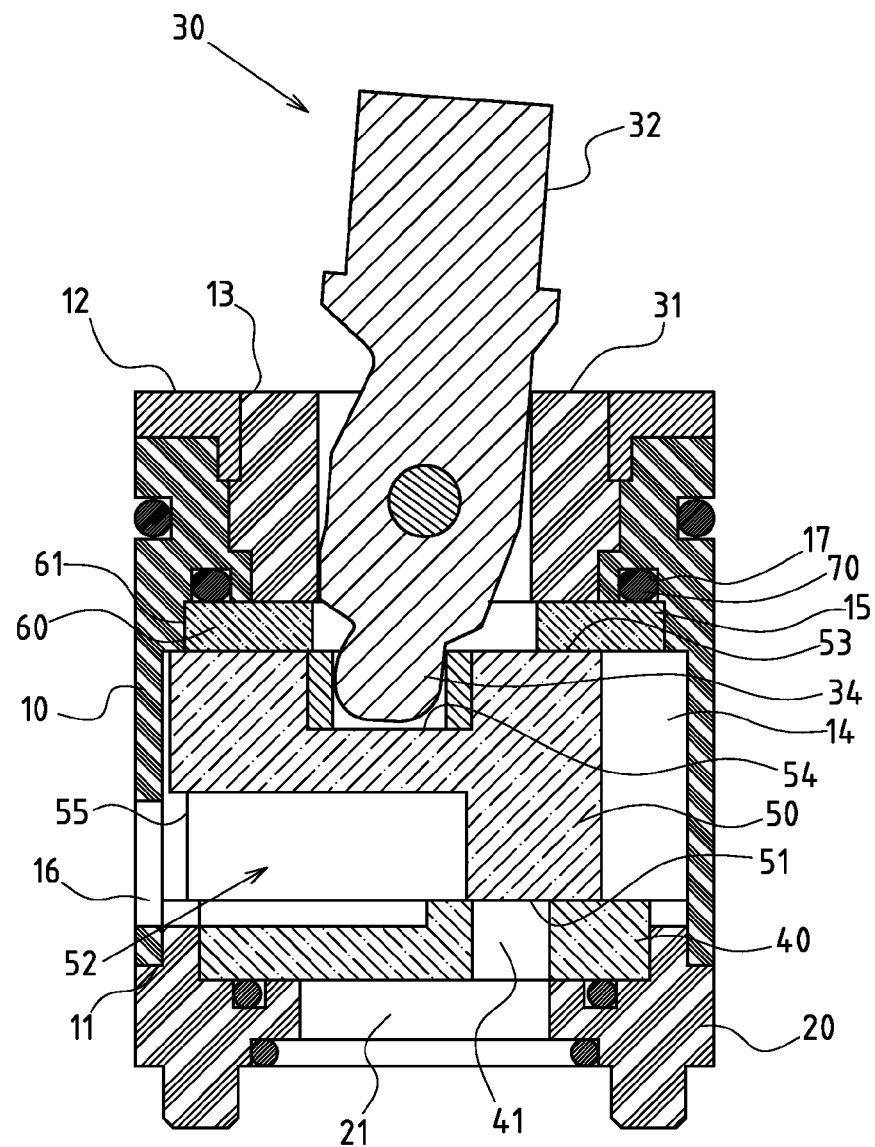
FIG. 3 is an assembled sectional view of the ceramic water control valve of the present invention.

FIGS. 1-3 depict preferred embodiments of a ceramic water control valve of the present invention with ceramic chips having pressing leak-proof functions, which, however, are provided for only explanatory purpose for patent claims.

Said ceramic water control valve comprises a shell 10, comprising of a lower port 11, an upper end wall 12, a reducing upper port 13 located in the center of the upper end wall 12 and a holding space 14 formed internally.

A pedestal 20 is assembled on the lower port 11 of the shell 10, comprising of at least a cold water inlet 21 and a hot water inlet 22.

A control member 30 is assembled on the upper port 12 of the shell 10, comprising of a positioning seat 31 and a control rod 32 pivoted on the positioning seat 31. Of which, the top of the control rod 32 is protruded above the upper port 13 of shell 10 and provided with a faucet handle positioning portion 33 (a screwed hole). A toggle part 34 located on the bottom of the control rod 32 is extended into the holding space 14 of the shell 10.

A fixed ceramic chip 40 is assembled on the pedestal 20, comprising of at least a cold water guide hole 41 and a hot water guide hole 42 correspondingly to cold water inlet 21 and hot water inlet 22 on the pedestal 20.

A sliding ceramic chip 50 is overlapped on the fixed ceramic chip 40. The sliding ceramic chip 50 allows a smooth surface 51 on its bottom to be overlapped tightly on the fixed ceramic chip 40 for a slidable displacement state. A water channel 52 recessed onto the smooth surface 51 is coupled with the cold and hot water guide holes 41, 42 on the fixed ceramic chip 40. A driven groove 54 is set on the top surface 53 of the sliding ceramic chip 50 for interlocking with the toggle part 34 of the control rod 32.

A pressing ceramic chip 60 is assembled between the top surface of the sliding ceramic chip 50 and the upper end wall 12 of the shell 10.

Figure 4:
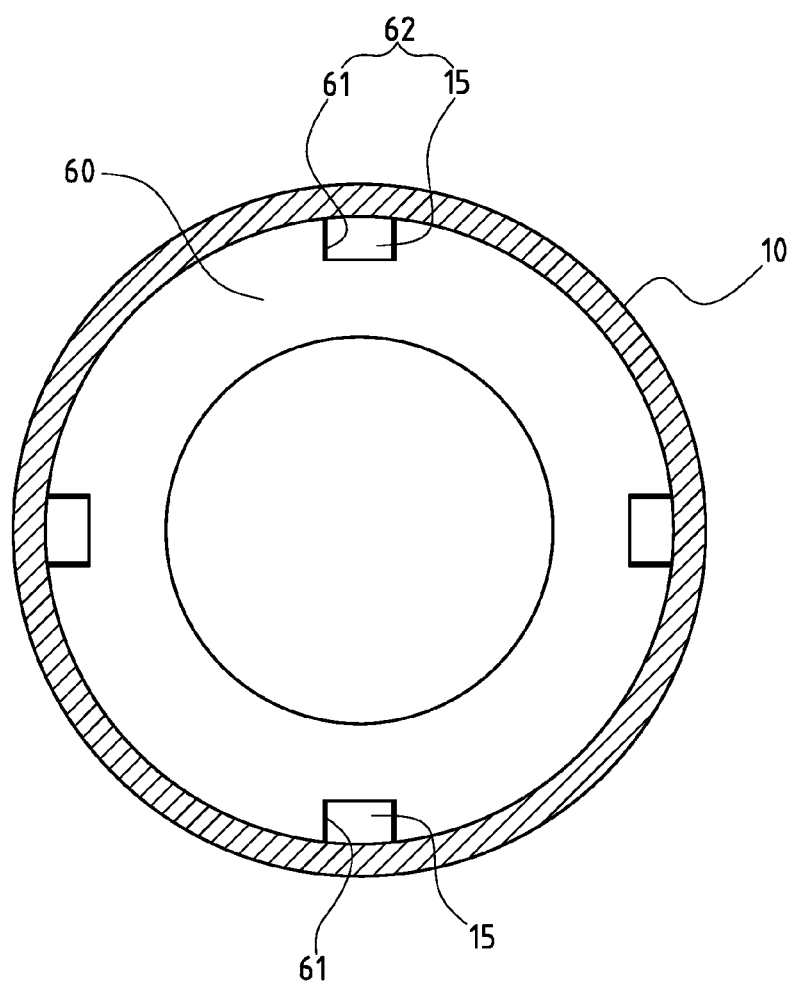
FIG. 4 is a sectional view of the internal structure of the ceramic water control valve of the present invention.

A directional positioning member 62, located on the pressing ceramic chip 60 correspondingly to the shell 10, enables the pressing ceramic chip 60 to be directionally positioned without rotation and displacement. Referring to FIG. 4, said directional positioning member 62 comprises of at least two inner concave edges 61 around the pressing ceramic chip 60 as well as a lug 15 correspondingly to the shell 10, so that the inner concave edge 61 is interlocked with the lug 15, enabling the pressing ceramic chip 60 to be directionally positioned without rotation and displacement.

A pressing seal ring 70 is an elastic ring set on the upper end wall 12 of the shell 10 in an embedded state. The pressing seal ring 70 could elastically push the pressing ceramic chip 60 onto the top surface 53 of the sliding ceramic chip 50.

Of which, the pressing ceramic chip 60 and the top surface 53 of the sliding ceramic chip 50 are tightly abutted via a smooth surface, so that the sliding ceramic chip 50 could also keep its smooth sliding displacement under the downward pressure of the pressing ceramic chip 60.

Referring to the FIGS. 2 and 3, the water channel 52 on the sliding ceramic chip 50 is provided with a lateral water outlet 55, so that a water discharge hole 16 is correspondingly set on one side of the shell 10 to form a lateral outflow path.

Of which, an annular groove 17 is set on the upper end wall 12 of the shell 10 for embedding of the pressing seal ring 70.

Based on above-specified structural design, the present invention is operated as follows:

Referring to FIG. 3, the water channel 52 of the sliding ceramic chip 50 of the preferred embodiment is provided with a lateral water outlet 55. Moreover, a lateral outflow path of the water discharge hole 16 is set correspondingly to the shell 10. When the control rod 32 is in a vertically angular state, the sliding ceramic chip 50 is driven to shift leftwards in the figure via toggle part 34 by pushing the driven groove 54. In such case, the cold and hot water guide holes, 41, 42 of the fixed ceramic chip 40 (in conjunction with FIG. 2) are blocked by the smooth surface 51 on the bottom of the sliding ceramic chip 50, so the water channel 52 could not be closed.

Figure 5:
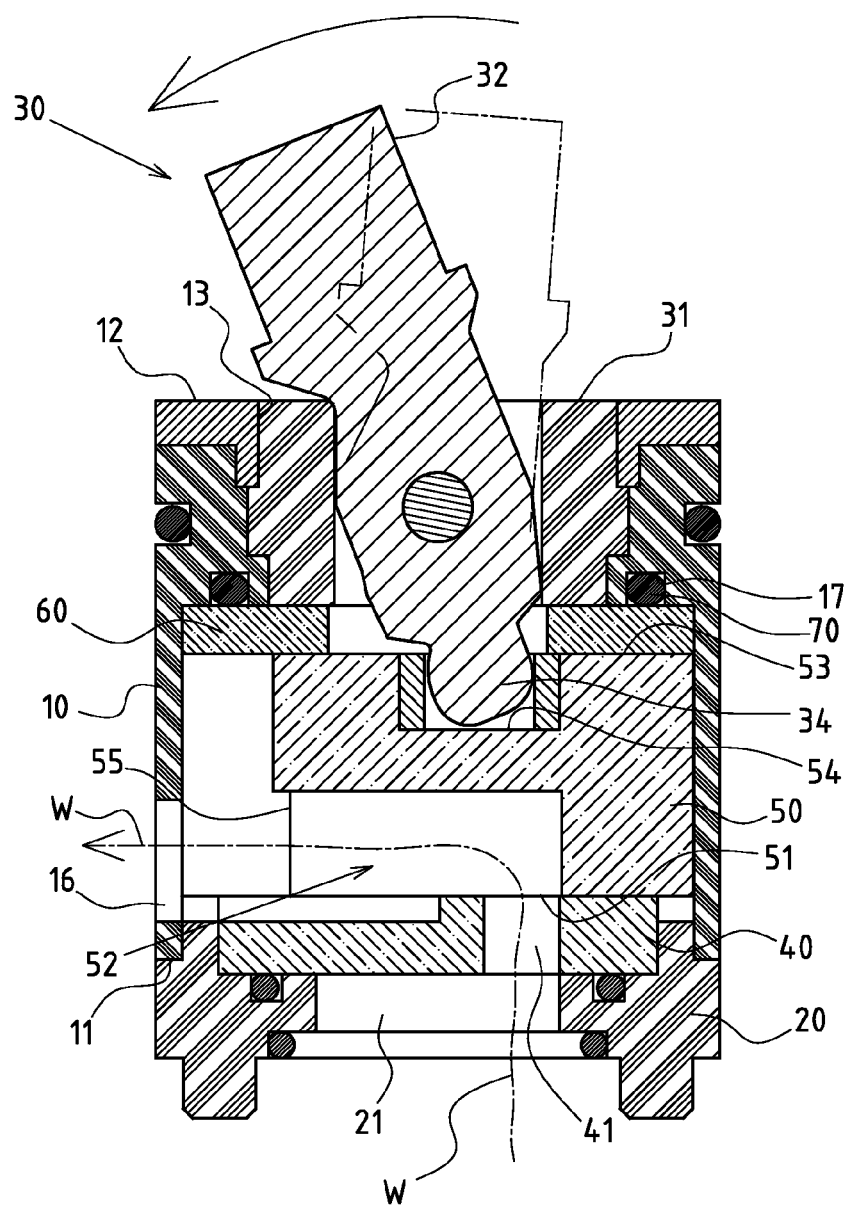
FIG. 5 is an actuating view of the control rod of the present invention.

Referring also to FIG. 5, when the control rod 32 is forced into an angular inclination state (shown by arrow L1), the sliding ceramic chip 50 is driven to shift rightwards in the figure via toggle part 34 by pushing the driven groove 54. In such case, the cold and hot water guide holes, 41, 42 of the fixed ceramic chip 40 (in conjunction with FIG. 2) are coupled with the water channel 52, so incoming water streams could flow upwards into the water channel 52, and then be guided out via the lateral water outlet 55 and the water discharge hole 16 at one side of the shell 10.

The core design of the present invention lies in that, the sliding displacement of the sliding ceramic chip 50 could obtain an elastic pressing force by the setting that said pressing ceramic chip 60 in directional positioning state is mated with the pressing seal ring 70. With this, the sliding ceramic chip 50 and the fixed ceramic chip 40 could be abutted with each other more tightly and durably to extend the service life of the ceramic water control valve. On the other hand, as for the structure of ceramic water control valve with a lateral outgoing path pattern (disclosed in FIGS. 1-5), the liquid flowing upwards in the holding space 14 of the shell 10 could produce heat-resistant sealing effect via the pressing ceramic chip 60, thus further enhancing the leak-proofing effect on top of the shell 10.

I claim:

1. A water control valve apparatus comprising:
    a shell having a lower port and an upper end wall and an upper port positioned in a center of said upper end wall, said shell having a holding space formed internally thereof;
    a pedestal assembled onto said lower port of the shell, said pedestal having a cold water inlet and a hot water inlet;
    a control member assembled onto said upper port of said shell, said control member having a positioning seat and a control rod pivotally mounted on said positioning seat, said control rod having a top protruding above said upper port of said shell, said control rod having a faucet handle positioning portion, said control rod having a toggle part located at a bottom thereof, said toggle part extending into said holding space of said shell;
    a fixed ceramic chip assembled onto said pedestal, said fixed ceramic chip having a cold water guide hole and a hot water guide hole respectively cooperative with said cold water inlet and said hot water inlet of said pedestal;
    a sliding ceramic chip overlapped on said fixed ceramic chip, said sliding ceramic chip having a smooth surface on a bottom thereof so as to be slidably displaceable with respect to said fixed ceramic chip, said smooth surface having a water channel recessed thereinto, said water channel coupled to said cold water guide hole and said hot water guide hole of said fixed ceramic chip, said sliding ceramic chip having a driven groove formed on a top surface thereof, said driven groove interlocked with said toggle particular of said control rod;
    a pressing ceramic chip assembled between said top surface of the sliding ceramic chip and said upper end wall of said shell;
    a directional positioning member located on said pressing ceramic chip, said directional positioning member causing said pressing ceramic chip to be directionally positioned without rotation or displacement; and
    an elastic ring embedded on said upper end wall of said shell, said elastic ring elastically pushing said pressing ceramic chip onto said top surface of said sliding ceramic chip, said pressing ceramic chip tightly abutted against said smooth surface of said sliding ceramic chip, said sliding ceramic chip pressed against said fixed ceramic chip when said pressing ceramic chip is mated with said elastic ring.

2. The water control valve apparatus of claim 1, said directional position member having at least two inner concave edges around said pressing ceramic chip, said directional positioning member having a lug corresponding to said shell, the inner concave edge interlocked with said lug.

3. The water control valve apparatus of claim 1, said water channel having a lateral water outlet, said shell having a water discharge hole on one side thereof so as to form a lateral outflow path with said lateral water outlet.

4. The water control valve apparatus of claim 1, said elastic ring received in an annular groove formed on said upper end wall of said shell.

* * * * *